US 11,535,153 B2

(12) United States Patent
Lee

(10) Patent No.: US 11,535,153 B2
(45) Date of Patent: Dec. 27, 2022

(54) APPARATUS, METHOD, AND VEHICLE FOR PROVIDING BRAKING LEVEL OF FORWARD VEHICLE

(71) Applicants: HYUNDAI MOTOR COMPANY, Seoul (KR); KIA MOTORS CORPORATION, Seoul (KR)

(72) Inventor: Hyun Woo Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 359 days.

(21) Appl. No.: 17/015,787

(22) Filed: Sep. 9, 2020

(65) Prior Publication Data

US 2021/0370829 A1 Dec. 2, 2021

(30) Foreign Application Priority Data

Jun. 2, 2020 (KR) .................. 10-2020-0066328

(51) Int. Cl.
*B60R 1/00* (2022.01)
*B60K 35/00* (2006.01)
(Continued)

(52) U.S. Cl.
CPC .............. *B60R 1/00* (2013.01); *B60K 35/00* (2013.01); *B60Q 9/00* (2013.01); *G06K 9/6268* (2013.01);
(Continued)

(58) Field of Classification Search
CPC . B60R 1/00; B60R 2300/301; B60R 2300/80; B60R 16/02; B60R 2300/105;
(Continued)

(56) References Cited

U.S. PATENT DOCUMENTS 7,698,032 B2 * 4/2010 Matsumoto ......... B60T 8/17557
701/79
9,988,047 B2 * 6/2018 Johnson ................. G08G 1/166
(Continued)

FOREIGN PATENT DOCUMENTS

CA         3029410 A1 * 1/2018 ............... B60R 1/00
CN       108839614 A  * 11/2018
(Continued)

*Primary Examiner* — Mahendra R Patel
(74) *Attorney, Agent, or Firm* — Morgan, Lewis & Bockius LLP

(57) ABSTRACT

An apparatus, method, and vehicle for providing a braking level of a forward vehicle may quantify a degree of braking of the forward vehicle into a braking level and provide the braking level of the forward vehicle to a driver. The apparatus includes a brake lamp position recognizing device configured to recognize positions of brake lamps of the forward vehicle based on an image and a relative acceleration of the forward vehicle, a braking determining device configured to determine whether or not braking of the forward vehicle is performed based on a brake lamp image extracted from the image of the forward vehicle, a braking level determining device configured to determine a braking level of the forward vehicle based on the relative acceleration of the forward vehicle, and a braking level image providing device configured to provide the determined braking level of the forward vehicle through an image.

20 Claims, 8 Drawing Sheets

(51) Int. Cl.
*G06T 7/73* (2017.01)
*G06K 9/62* (2022.01)
*B60Q 9/00* (2006.01)
*G06V 20/58* (2022.01)

(52) U.S. Cl.
CPC .............. *G06T 7/74* (2017.01); *G06V 20/584* (2022.01); *B60K 2370/152* (2019.05); *B60K 2370/16* (2019.05); *B60K 2370/177* (2019.05); *B60R 2300/301* (2013.01); *B60R 2300/80* (2013.01); *G06T 2207/30252* (2013.01)

(58) Field of Classification Search
CPC .............. B60K 35/00; B60K 2370/152; B60K 2370/16; B60K 2370/177; B60K 2370/188; B60K 2370/21; B60K 2370/48; B60K 2370/167; B60K 2370/1876; B60Q 9/00; B60Q 9/008; G06K 9/6268; G06T 7/74; G06T 2207/30252; G06V 20/584; B60W 40/02; B60W 40/107; B60W 50/14; B60W 2050/146; B60W 2420/42; B60W 2420/52; B60W 2520/105
USPC ......................................................... 382/103
See application file for complete search history.

(56) References Cited

U.S. PATENT DOCUMENTS

| | | | |
|---|---|---|---|
| 10,679,497 B1* | 6/2020 | Konrardy | G08G 1/096725 |
| 2015/0336547 A1* | 11/2015 | Dagan | G06T 7/269 |
| | | | 701/70 |
| 2017/0066440 A1* | 3/2017 | Koravadi | G08G 1/164 |
| 2018/0211528 A1* | 7/2018 | Seifert | G06V 20/56 |
| 2019/0283772 A1* | 9/2019 | Ishisaka | B60W 50/087 |
| 2020/0216044 A1* | 7/2020 | Chow | B60T 8/171 |

FOREIGN PATENT DOCUMENTS

| | | | | |
|---|---|---|---|---|
| CN | 109598244 A | * | 4/2019 | |
| CN | 110603177 A | * | 12/2019 | .............. B60T 7/22 |
| JP | 2004295597 A | * | 10/2004 | |
| JP | 3601451 B2 | * | 12/2004 | |
| JP | 3991915 B2 | * | 10/2007 | |
| JP | 4698002 B2 | * | 6/2011 | ............. B60K 35/00 |
| JP | 2021504856 A | * | 4/2019 | |
| JP | 2021060935 A | * | 4/2021 | |
| KR | 101484115 B1 | * | 10/2014 | |
| KR | 2014131897 A | * | 11/2014 | |
| KR | 10-1484115 B1 | | 1/2015 | |
| WO | WO-2005027075 A1 | * | 3/2005 | ............. B60Q 9/008 |
| WO | WO-2015177643 A2 | * | 11/2015 | ............. B60T 17/221 |

* cited by examiner

APPARATUS, METHOD, AND VEHICLE FOR PROVIDING BRAKING LEVEL OF FORWARD VEHICLE

The present application claims the benefit of priority to Korean Patent Application No. 10-2020-0066328, filed on Jun. 2, 2020 in the in the Korean Intellectual Property Office (KIPO), the disclosure of which is hereby incorporated by reference.

TECHNICAL FIELD

The present disclosure relates to an apparatus for providing a braking level of a forward vehicle, and more particularly, to an apparatus, method, and vehicle for providing a braking level of a forward vehicle, which may quantify the degree of braking of the forward vehicle into a braking level and provide the braking level of the forward vehicle to a driver.

BACKGROUND

In general, brake lamps, which are turned on whenever a driver performs a braking operation, i.e., depresses a brake pedal, are installed at the rear end of a vehicle.

Therefore, vehicle drivers may recognize whether or not a forward vehicle is braked through on/off operation of brake lamps installed at the rear end of the forward vehicle.

In some cases, in order to increase visibility of the brake lamps, auxiliary brake lamps having various shapes may be additionally installed at the rear end of the vehicle in addition to the main brake lamps installed on both sides of the rear end.

However, the brake lamps and the auxiliary brake lamps are used merely to indicate whether or not the braking operation is performed, i.e., whether a driver depresses the brake pedal or takes his/her foot off the brake pedal, and thus, it may be difficult for the drivers to immediately recognize the degree of deceleration of the forward vehicle.

That is, vehicle drivers have difficulty immediately recognizing the degree of deceleration of a forward vehicle when the brake lamps of the forward vehicle are turned on, and thus, try full braking in order to ensure safety, thereby causing unnecessary traffic congestion and waste of energy.

Because of regulations stipulating that brake lamps must be turned on at the same brightness regardless of the extent to which a brake pedal is depressed, it is not possible to apply technology that divides the brightness of brake lamps into a plurality of levels or controls the brightness of the brake lamps using a plurality of luminous bodies to brake lamps.

Therefore, development of an apparatus for providing a braking level of a forward vehicle, which quantifies a degree of braking of the forward vehicle into the braking level and displays the braking level of the forward vehicle, so that a driver may directly recognize the degree of deceleration of the forward vehicle, is required.

The information disclosed in the Background section above is to aid in the understanding of the background of the present disclosure, and should not be taken as acknowledgement that this information forms any part of prior art.

SUMMARY

Accordingly, the present disclosure is directed to an apparatus, method, and vehicle for providing a braking level of a forward vehicle that substantially obviate one or more problems due to limitations and disadvantages of the related art.

An object of the present disclosure is to provide an apparatus, method, and vehicle for providing a braking level of a forward vehicle, which quantify the degree of braking of the forward vehicle into the braking level and displays the braking level of the forward vehicle, so that a driver may directly recognize the degree of deceleration of the forward vehicle.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, an apparatus for providing a braking level of a forward vehicle includes a brake lamp position recognizing device configured to recognize positions of brake lamps of the forward vehicle based on an image of the forward vehicle and a relative acceleration of the forward vehicle, a braking determining device configured to determine whether or not braking of the forward vehicle is performed based on a brake lamp image extracted from the image of the forward vehicle when the positions of the brake lamps are recognized, a braking level determining device configured to determine the braking level of the forward vehicle based on the relative acceleration of the forward vehicle upon determining that braking of the forward vehicle is performed, and a braking level image providing device configured to provide the determined braking level of the forward vehicle through an image when the braking level is determined.

In another aspect of the present disclosure, a method for providing a braking level of a forward vehicle in an apparatus for providing the braking level of the forward vehicle, including a brake lamp position recognizing device, a braking determining device, a braking level determining device and braking level image providing device, includes recognizing, by the brake lamp position recognizing device, positions of brake lamps of the forward vehicle based on an image of the forward vehicle and a relative acceleration of the forward vehicle, determining, by the braking determining device, whether or not braking of the forward vehicle is performed based on a brake lamp image extracted from the image of the forward vehicle when the positions of the brake lamps are recognized, determining, by the braking level determining device, the braking level of the forward vehicle based on the relative acceleration of the forward vehicle upon determining that braking of the forward vehicle is performed, and providing, by the braking level image providing device, the determined braking level of the forward vehicle through an image when the braking level is determined.

In yet another aspect of the present disclosure, a computer readable recording medium, in which a program for executing the method for providing the braking level of the forward vehicle in the apparatus for providing the braking level of the forward vehicle is recorded, executes a process provided by the method for providing the braking level of the forward vehicle.

In still yet another aspect of the present disclosure, a vehicle includes a camera configured to acquire an image of a forward vehicle, a radar configured to acquire a relative acceleration of the forward vehicle, a display configured to display a braking level image of the forward vehicle, and an apparatus for providing a braking level of the forward vehicle, configured to determine the braking level of the forward vehicle based on the image of the forward vehicle and the relative acceleration of the forward vehicle and to provide the braking level through an image, wherein the apparatus recognizes positions of brake lamps of the forward vehicle based on the image of the forward vehicle and the relative acceleration of the forward vehicle, determines whether braking of the forward vehicle is performed based on a brake lamp image extracted from the image of the forward vehicle, determines the braking level of the forward vehicle based on the relative acceleration of the forward vehicle, generates a braking level image based on the determined braking level of the forward vehicle, and provides the braking level image to the display.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
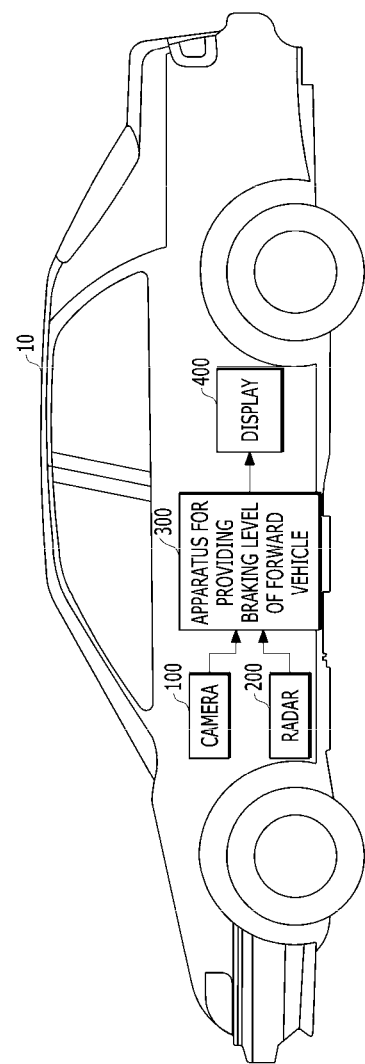
FIG. 1 is a view illustrating a vehicle including an apparatus for providing the braking level of a forward vehicle according to one embodiment of the present disclosure.

Reference will now be made in detail to the preferred embodiments of the present disclosure, examples of which are illustrated in the accompanying drawings. However, the embodiments of the present disclosure are not limited to the embodiments set forth herein, and may be variously modified. In the drawings, in order to clearly describe the present disclosure, descriptions of elements which are not related to the present disclosure will be omitted, and the same or similar elements are denoted by the same reference numerals even when they are depicted in different drawings.

In the following description of the embodiments, it will be understood that, when a part is said to "include" an element, the part may further include other elements and does not exclude presence of such other elements, unless stated otherwise. Further, in the following description of the embodiments, it will be understood that the suffixes "part", "unit" and "module" indicate a unit for processing at least one function or operation, and may be implemented using hardware, software, or a combination of hardware and software.

Hereinafter, with reference to FIGS. 1 to 9, an apparatus, method, and vehicle for providing the braking level of a forward vehicle, which are applicable to the embodiments of the present disclosure, will be described in detail.

In the present disclosure, a braking level may mean a level which visually represents the degree of deceleration of a vehicle, which is performed by a braking operation in which a driver presses a brake pedal.

FIG. 1 is a view illustrating a vehicle including an apparatus for providing the braking level of a forward vehicle according to one embodiment of the present disclosure.

As shown in FIG. 1, the vehicle according to the present disclosure may include cameras 100 which acquire the image of a forward vehicle, radars 200 which acquire the relative acceleration of the forward vehicle, a display 400 which displays the braking level image of the forward vehicle, and an apparatus 300 for providing the braking level of the forward vehicle which determines the braking level of the forward vehicle based on the image and the relative acceleration of the forward vehicle and provides the braking level through an image.

Here, the apparatus 300 may recognize the positions of brake lamps of the forward vehicle based on the image and the relative acceleration of the forward vehicle, determine whether or not braking of the forward vehicle is performed based on a brake lamp image extracted from the image of the forward vehicle, determine the braking level of the forward vehicle based on the relative acceleration of the forward vehicle, generate a braking level image based on the determined braking level of the forward vehicle, and provide the braking level image to the display 400.

For example, the display 400 may include at least one of an Audio/Video/Navigation/Telematics (AVNT) system, a head-up display (HUD), a windshield and a cluster, but is not limited thereto.

Further, the apparatus 300 may acquire the image of the forward vehicle from a front camera 100 among a plurality of cameras 100, and acquire the relative acceleration of the forward vehicle from a front radar 200 among a plurality of radars 200. The front camera 100 and the front radar 200 may be communicatively connected to the apparatus 300.

Further, in the recognition of the positions of the brake lamps of the forward vehicle, the apparatus 300 may classify the image of the forward vehicle into one of a lighting image in which the brake lamps are turned on and a non-lighting image in which the brake lamps are not turned on, store the image of the forward vehicle as one of the lighting image and the non-lighting image, and recognize the positions of the brake lamps of the forward vehicle by comparing the classified lighting image and non-lighting image with each other.

Here, in the classification of the image of the forward vehicle, when the image of the forward vehicle is acquired, the apparatus 300 may acquire the acceleration of a host vehicle and the relative acceleration of the forward vehicle with respect to the acceleration of the host vehicle, and classify the image of the forward vehicle into one of the lighting image in which the brake lamps are turned on and the non-lighting image in which the brake lamps are not turned on based on the acceleration of the host vehicle and the relative acceleration of the forward vehicle.

For example, in the classification of the image of the forward vehicle, the apparatus 300 may classify the image of the forward vehicle into the non-lighting image in which the brake lamps are not turned on, when both the acceleration of the host vehicle and the relative acceleration of the forward vehicle are 0 kilometers per hour per second (kph/s) or higher, and classify the image of the forward vehicle into the lighting image in which the brake lamps are turned on, when the acceleration of the host vehicle is 0 kph/s and the relative acceleration of the forward vehicle is at a threshold, which is less than 0 kph/s, or lower.

Thereafter, the apparatus 300 may store position information of the brake lamps of the forward vehicle, when the positions of the brake lamps of the forward vehicle are stored, extract the brake lamp image from the image of the forward vehicle based on the position information of the brake lamps of the forward vehicle, and store the extracted brake lamp image.

For example, in the storage of the position information of the brake lamps of the forward vehicle, the apparatus 300 may store information about the positions of the brake lamps of the forward vehicle, including the position of a brake lamp arranged at the left side of the forward vehicle, the position of a brake lamp arranged at the right side of the forward vehicle and the position of a brake lamp arranged at the upper portion of the forward vehicle, without being limited thereto.

That is, the apparatus 300 may pre-store position information of a plurality of brake lamps corresponding to various kinds of vehicles through learning.

Further, in the storage of the extracted brake lamp image, the apparatus 300 may store a brake lamp image including at least one of a brake lamp image in a lighting state or a brake lamp image in a non-lighting state.

In addition, in the determination as to whether or not braking of the forward vehicle is performed, the apparatus 300 may extract the brake lamp image from the image of the forward vehicle, and determine whether or not braking of the forward vehicle is performed by comparing the extracted brake lamp image with the brake lamp image in the lighting state and the brake lamp image in the non-lighting state, which are pre-stored.

For example, the apparatus 300 may compare the extracted brake lamp image with the brake lamp image in the lighting state and the brake lamp image in the non-lighting state which are pre-stored, and, as a result of the comparison, when the brake lamps of the forward vehicle are recognized as being in the lighting state, determine that braking of the forward vehicle is performed, and when the brake lamps of the forward vehicle are recognized as being in the non-lighting state, determine that braking of the forward vehicle is not performed.

Thereafter, in the determination of the braking level of the forward vehicle, upon determining that braking of the forward vehicle is performed, the apparatus 300 may acquire the relative acceleration of the forward vehicle, and determine the braking level of the forward vehicle based on the relative acceleration of the forward vehicle when the acquired relative acceleration of the forward vehicle is lower than 0 kph/s.

Here, upon determining that braking of the forward vehicle is performed, the apparatus 300 may set the braking level of the forward vehicle to a minimum value before acquiring the relative acceleration of the forward vehicle.

For example, if the braking level is set to be in the range of 1, as a minimum value, to 10, as a maximum value, the apparatus 300 may set the braking level of the forward vehicle to 1 to the minimum level upon determining that braking of the forward vehicle is performed, and then determine the braking level of the forward vehicle based on the relative acceleration of the forward vehicle.

Further, in the determination of the braking level of the forward vehicle, when a result value acquired by dividing the relative acceleration of the forward vehicle by 10 is the maximum value of the braking level or less, the apparatus 300 may set the braking level of the forward vehicle based on the result value.

Alternatively, in the determination of the braking level of the forward vehicle, when the result value acquired by dividing the relative acceleration of the forward vehicle by 10 is greater than the maximum value of the braking level, the apparatus 300 may set the result value to the maximum value of the braking level.

For example, if the braking level is set to be in the range of 1, as a minimum value, to 10, as a maximum value of the braking level, the apparatus 300 may set the braking level of the forward vehicle to the maximum value, i.e., 10, even when the determined result value is 15.

Thereafter, in the provision of the braking level image, the apparatus 300 may acquire the image of the forward vehicle, select a braking level display region from the image of the forward vehicle, and provide an image, in which the braking level of the forward vehicle is displayed, to the selected braking level display region.

Here, in the selection of the braking level display region, the apparatus 300 may select a region of the image of the forward vehicle, which does not overlap the brake lamps, as the braking level display region.

The reason for this is that both the image of the brake lamps of the forward vehicle and the braking level are provided so that the driver may easily recognize the degree of deceleration of the forward vehicle.

For example, in the selection of the braking level display region, the apparatus 300 may select a rear body region of the forward vehicle, which does not overlap the brake lamps, from the image of the forward vehicle as the braking level display region, but the braking level display region is not limited thereto.

Thereafter, in the provision of the braking level image, the apparatus 300 may process the image of the forward vehicle including the braking level using augmented reality, and provide the processed image of the forward vehicle to the display 400.

In some cases, in the provision of the braking level image, if at least one brake lamp of the forward vehicle is not turned on due to failure thereof, the apparatus 300 may provide the image of the brake lamps in the lighting state together with the braking level.

That is, in the provision of the braking level image, if at least one brake lamp of the forward vehicle is not turned on due to failure thereof, the apparatus 300 may process the image of the forward vehicle using augmented reality so that the image of the forward vehicle includes the image of the brake lamps in the lighting state and the braking level, and provide the processed image of the forward vehicle to the display 400 of the host vehicle.

As such, the apparatus 300 according to the present disclosure quantifies the degree of braking of the forward vehicle into the braking level and provides the braking level through an image, and may thus allow a driver to directly recognize the degree of deceleration of the forward vehicle so as to enable the host vehicle to be efficiently driven in a traffic jam and improve energy efficiency.

Further, the apparatus 300 according to the present disclosure displays the degree of braking of the forward vehicle using augmented reality, and may thus provide information assisting the driver in safely driving so as to avoid unnecessarily full braking.

In addition, the apparatus 300 according to the present disclosure recognizes full braking of the forward vehicle from a far distance and then allows the driver to perform braking appropriate for the host vehicle, thereby being capable of reducing the possibility of an accident.

Moreover, the apparatus 300 according to the present disclosure recognizes the low braking level of the forward vehicle and then allows the driver to perform braking appropriate for the host vehicle, thereby being capable of reducing unnecessary energy consumption.

Figure 2:
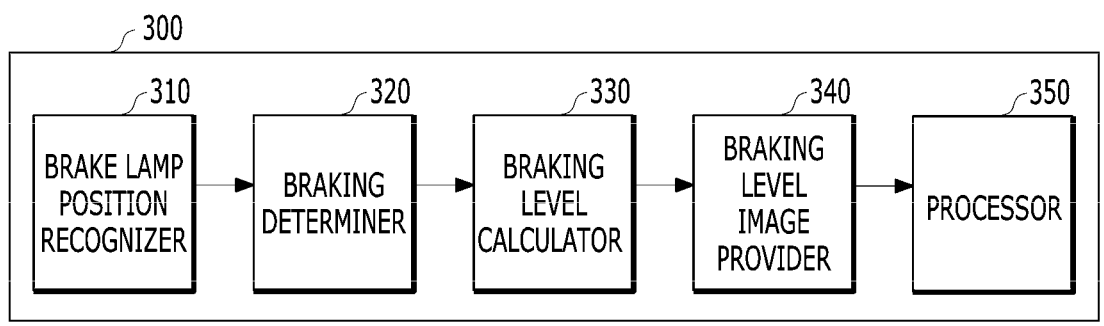
FIG. 2 is a block diagram illustrating the apparatus according to one embodiment of the present disclosure.

FIG. 2 is a block diagram illustrating the apparatus according to one embodiment of the present disclosure.

As shown in FIG. 2, the apparatus 300 may include a processor 350. The processor 350 has an associated non-transitory memory storing software instructions which, when executed by the processor 350, provides the functionalities of a brake lamp position recognizing device 310, a braking determining device 320, a braking level determining device 330 and a braking level image providing device 340. The processor 350 may take the form of one or more processor(s) and associated memory storing program instructions. The processor 350 may be, e.g., a computer, a microprocessor, a CPU, an ASIC, a circuitry, logic circuits, etc.). Herein, the memory and the processor 350 may be implemented as separate semiconductor circuits. Alternatively, the memory and the processor 350 may be implemented as a single integrated semiconductor circuit.

Here, the brake lamp position recognizing device 310 of the processor 350 may recognize the positions of the brake lamps of the forward vehicle based on the image of the forward vehicle and the relative acceleration of the forward vehicle.

The brake lamp position recognizing device 310 may acquire the image of the forward vehicle from the front camera, and acquire the relative acceleration of the forward vehicle from the front radar.

In the recognition of the positions of the brake lamp of the forward vehicle, when the image of the forward vehicle is acquired, the brake lamp position recognizing device 310 may classify the image of the forward vehicle into one of the lighting image in which the brake lamps are turned on and the non-lighting image in which the brake lamps are not turned on, store the image of the forward vehicle as one of the lighting image and the non-lighting image, and recognize the positions of the brake lamps of the forward vehicle by comparing the classified lighting image and non-lighting image with each other.

In the classification of the image of the forward vehicle, when the image of the forward vehicle is acquired, the brake lamp position recognizing device 310 acquires the acceleration of the host vehicle and the relative acceleration of the forward vehicle, and classifies the image of the forward vehicle into one of the lighting image in which the brake lamps are turned on and the non-lighting image in which the brake lamps are not turned on based on the acceleration of the host vehicle and the relative acceleration of the forward vehicle.

For example, in the classification of the image of the forward vehicle, the brake lamp position recognizing device 310 may classify the image of the forward vehicle into the non-lighting image in which the brake lamps are not turned on, when both the acceleration of the host vehicle and the relative acceleration of the forward vehicle are 0 kilometers per hour (kph/s) or higher, and classify the image of the forward vehicle into the lighting image in which the brake lamps are turned on, when the acceleration of the host vehicle is 0 kph/s and the relative acceleration of the forward vehicle is at the threshold, which is less than 0 kph/s, or lower.

Here, the threshold may be about—10 kph/s or lower, but is not limited thereto.

Further, when the positions of the brake lamps of the forward vehicle are stored, the brake lamp position recognizing device 310 may store position information of the brake lamps of the forward vehicle, extract the brake lamp image from the image of the forward vehicle based on the position information of the brake lamps of the forward vehicle, and store the extracted brake lamp image.

Here, in the storage of the position information of the brake lamps of the forward vehicle, the brake lamp position recognizing device 310 may store information about the positions of the brake lamps of the forward vehicle, including the position of the brake lamp arranged at the left side of the forward vehicle, the position of the brake lamp arranged at the right side of the forward vehicle and the position of the brake lamp arranged at the upper portion of the forward vehicle.

Further, in the storage of the extracted brake lamp image, the brake lamp position recognizing device 310 may store a brake lamp image including at least one of the brake lamp image in the lighting state or the brake lamp image in the non-lighting state.

Thereafter, the braking determining device 320 of the processor 350 may determine whether or not braking of the forward vehicle is performed based on the brake lamp image extracted from the image of the forward vehicle, when the positions of the brake lamps are recognized.

Here, in the determination as to whether or not braking of the forward vehicle is performed, the braking determining device 320 may extract the brake lamp image from the image of the forward vehicle, and determine whether or not braking of the forward vehicle is performed by comparing the extracted brake lamp image with the brake lamp image in the lighting state or the brake lamp image in the non-lighting state, which are pre-stored.

That is, in the determination as to whether or not braking of the forward vehicle is performed, the braking determining device 320 may compare the extracted brake lamp image with the brake lamp image in the lighting state and the brake lamp image in the non-lighting state, and, as a result of the comparison, when the brake lamps of the forward vehicle are recognized as being in the lighting state, determine that braking of the forward vehicle is performed, and when the brake lamps of the forward vehicle are recognized as being in the non-lighting state, determine that braking of the forward vehicle is not performed.

Thereafter, upon determining that braking of the forward vehicle is performed, the braking level determining device 330 of the processor 350 may determine the braking level of the forward vehicle based on the relative acceleration of the forward vehicle.

Here, in the determination of the braking level of the forward vehicle, upon determining that braking of the forward vehicle is performed, the braking level determining device 330 may acquire the relative acceleration of the forward vehicle, and determine the braking level of the forward vehicle based on the relative acceleration of the forward vehicle when the acquired relative acceleration of the forward vehicle is lower than 0 kph/s.

Further, upon determining that braking of the forward vehicle is performed, the braking level determining device 330 may set the braking level of the forward vehicle to the minimum value before acquiring the relative acceleration of the forward vehicle.

Thereafter, in the determination of the braking level of the forward vehicle, when the result value acquired by dividing the relative acceleration of the forward vehicle by 10 is the maximum value of the braking level or less, the braking level determining device 330 may set the braking level of the forward vehicle based on the result value.

That is, when the braking level of the forward vehicle is set, the braking level determining device 330 may use the resultant value as the braking level of the forward vehicle.

For example, the braking level of the forward vehicle may be the same as the result value acquired by dividing the relative acceleration of the forward vehicle by 10.

For example, if the braking level is set to be in the range of 1, as a minimum value, to 10, as a maximum value, when the determined result value is 8, the braking level determining device 330 may set the braking level of the forward vehicle to 8.

Alternatively, in the determination of the braking level of the forward vehicle, when the result value acquired by dividing the relative acceleration of the forward vehicle by 10 is greater than the maximum value of the braking level, the braking level determining device 330 may set the result value to the maximum value of the braking level.

For example, the maximum value of the braking level may be smaller than the result value acquired by dividing the relative acceleration of the forward vehicle by 10.

For example, if the braking level is set to be in the range of 1, as a minimum value, to 10, as a maximum value, when the determined result value is 15, the braking level determining device 330 may set the braking level of the forward vehicle to the maximum value, i.e., 10.

Thereafter, when the braking level is determined, the braking level image providing device 340 of the processor 350 may provide the determined braking level of the forward vehicle through an image.

Here, in the provision of the braking level through the image, the braking level image providing device 340 may acquire the image of the forward vehicle, select a braking level display region from the image of the forward vehicle, and provide an image, in which the braking level of the forward vehicle is displayed, to the selected braking level display region.

Here, in the selection of the braking level display region, the braking level image providing device 340 may select a region of the image of the forward vehicle, which does not overlap the brake lamps, as the braking level display region.

For example, in the selection of the braking level display region, the braking level image providing device 340 may select a rear body region of the forward vehicle, which does not overlap the brake lamps, from the image of the forward vehicle as the braking level display region.

The reason for this is that both the image of the brake lamps of the forward vehicle and the braking level are provided so that the driver may easily recognize the degree of deceleration of the forward vehicle.

Further, the braking level image providing device 340 may generate a braking level image including the braking level when the braking level display region is selected, combine the braking level image with the braking level display region of the image of the forward vehicle, and provide the combined image including the braking level.

For example, the braking level image providing device 340 may process the combined image including the braking level using augmented reality and provide the processed image, without being limited thereto.

In the provision of the braking level through the image, the braking level image providing device 340 may process the image of the forward vehicle including the braking level using augmented reality and provide the processed image to the display 400 of the host vehicle.

Here, the display 400 of the host vehicle may include at least one of a windshield, a cluster, a head-up display (HUD) and an Audio/Video/Navigation/Telematics (AVNT) system, but is not limited thereto.

In some cases, in the provision of the braking level through the image, if at least one brake lamp of the forward vehicle is not turned on due to failure thereof, the braking level image providing device 340 may provide the lighting image of the brake lamps together with the braking level.

That is, in the provision of the braking level through the image, if at least one brake lamp of the forward vehicle is not turned on, the braking level image providing device 340 may process the image of the forward vehicle using augmented reality so that the image of the forward vehicle includes the lighting image of the brake lamps and the braking level, and provide the processed image of the forward vehicle to the display 400 of the host vehicle.

Figure 3:
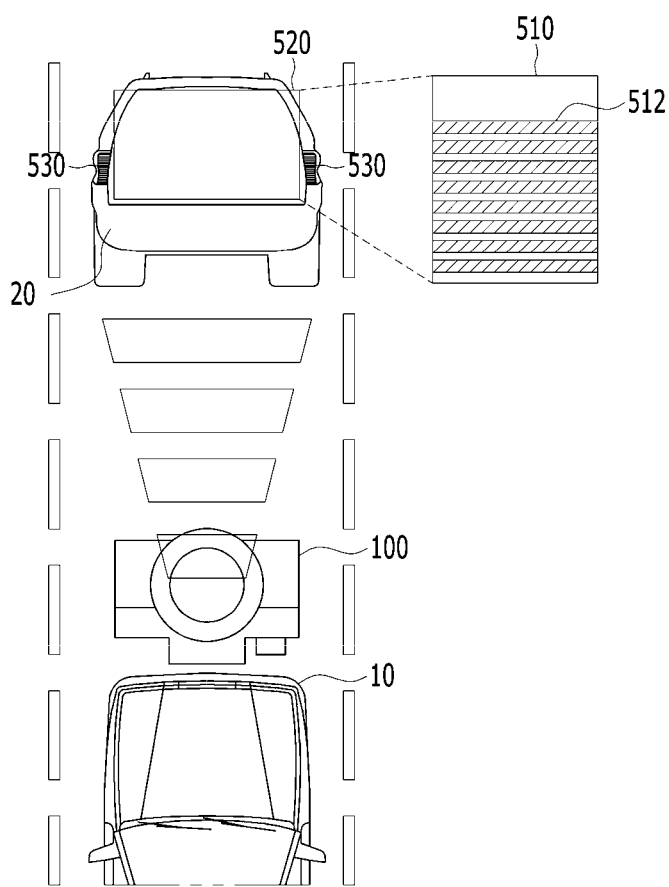
FIG. 3 is a view illustrating a process of providing the braking level of the forward vehicle.

FIG. 3 is a view illustrating a process of providing the braking level of a forward vehicle.

As shown in FIG. 3, in the present disclosure, the image of a forward vehicle 20 may be acquired from a front camera 100 of a host vehicle 10, and the relative acceleration of the forward vehicle 20 may be acquired from a front radar (not shown) of the host vehicle 10.

Further, in the present disclosure, the image of the forward vehicle 20 may be classified into one of a lighting image in which the brake lamps 530 are turned on and a non-lighting image in which the brake lamps 530 are not turned on based on the acceleration of the host vehicle 10 and the relative acceleration of the forward vehicle 20, store the image of the forward vehicle 20 as one of the lighting image and the non-lighting image, and recognize the positions of the brake lamps 530 of the forward vehicle 20 by comparing the classified lighting image and non-lighting image with each other.

Thereafter, in the present disclosure, a brake lamp image may be extracted from the image of the forward vehicle 20, and whether or not braking of the forward vehicle 20 is performed may be determined by comparing the extracted brake lamp image with images of the brake lamps 530 in a lighting state and a non-lighting state, which are pre-stored.

Subsequently, in the present disclosure, upon determining that braking of the forward vehicle 20 is performed, the relative acceleration of the forward vehicle 20 may be acquired, and a braking level 512 of the forward vehicle 20 may be determined based on the relative acceleration of the forward vehicle 20 when the acquired relative acceleration of the forward vehicle 20 is lower than 0 kph/s.

Thereafter, in the present disclosure, the image of the forward vehicle 20 may be acquired, a braking level display region 520 may be selected from the image of the forward vehicle 20, and a braking level image 510, in which the braking level 512 is displayed, may be provided to the selected braking level display region 520.

Here, in the present disclosure, a rear body region of the forward vehicle 20, which does not overlap the brake lamps 530, may be selected from the image of the forward vehicle 20 as the braking level display region 520, but the braking level display region 520 is not limited thereto.

The reason for this is that both the image of the brake lamps 530 of the forward vehicle 20 and the braking level 520 of the forward vehicle 20 are provided so that a driver may easily recognize the degree of deceleration of the forward vehicle 20.

Thereafter, in the present disclosure, the image of the forward vehicle 20 including the braking level image 510 may be processed using augmented reality, and the processed image may be provided to a display of the host vehicle 10.

Figure 4:
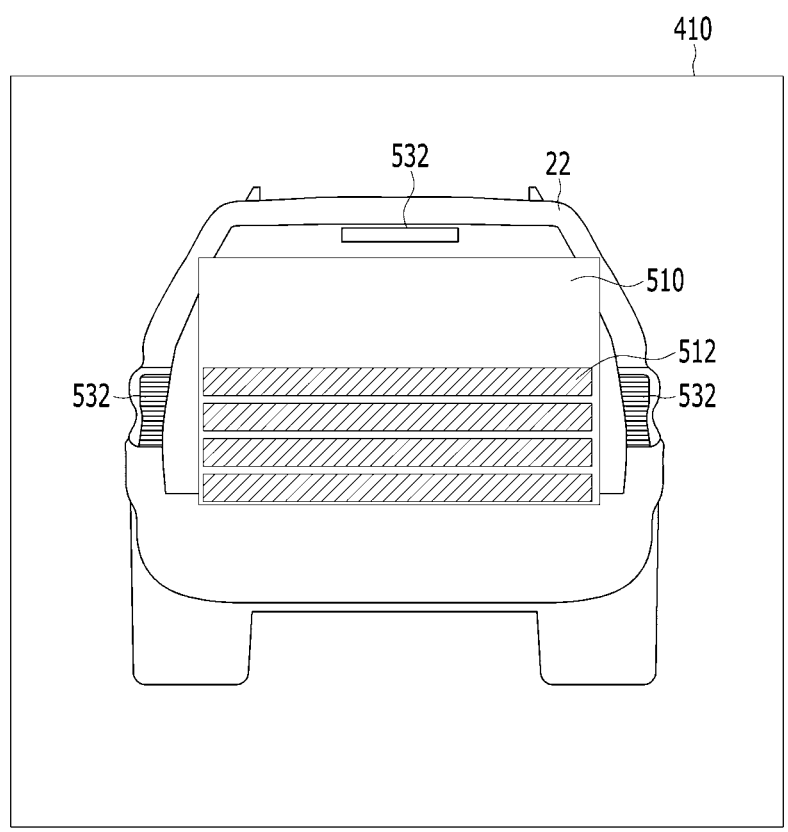
FIG. 4 is a view illustrating the braking level of the forward vehicle displayed on a screen of a display.

FIG. 4 is a view illustrating the braking level of the forward vehicle displayed on a screen of the display.

As shown in FIG. 4, in the present disclosure, when the braking level display region is selected, the braking level image 510 including the braking level 512 may be generated, the braking level image 510 may be combined with the braking level display region of an image 22 of the forward vehicle 20, the combined image including the braking level 512 may be processed using augmented reality, and the processed image may be displayed on a screen 410 of the display.

Here, in the present disclosure, a rear body region of the forward vehicle 20, which does not overlap brake lamp regions 532, may be selected from the image 22 of the forward vehicle 20 as the braking level display region 520.

Further, in the preset invention, the braking level image 510, in which braking levels may be distinguished using differences in colors, shapes, sounds or color densities, may be provided.

In addition, in the present disclosure, a point in time at which the brake lamps of the forward vehicle are turned on or the relative acceleration of the forward vehicle becomes a negative threshold or lower may be determined as a braking level display time.

FIGS. 5 to 9 are flowcharts illustrating a method for providing a braking level of a forward vehicle according to one embodiment of the present disclosure.

Figure 5:
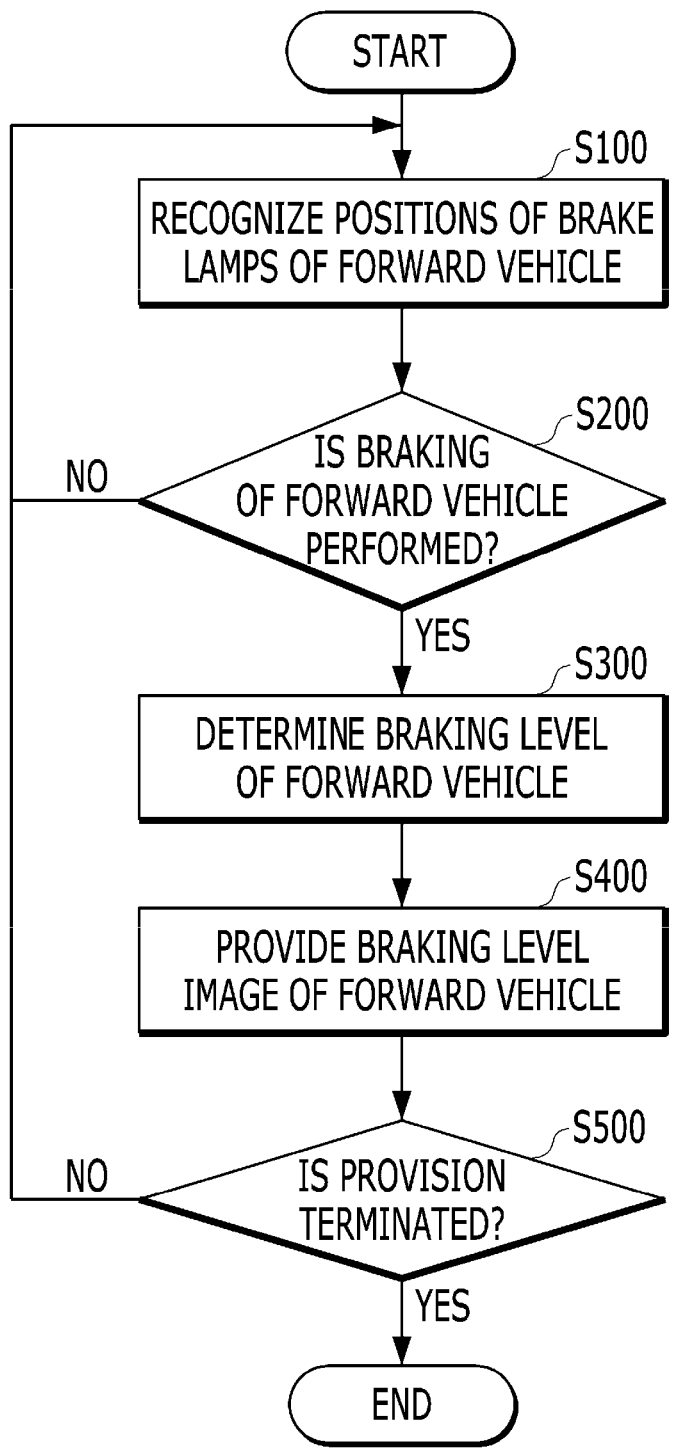
FIGS. 5 to 9 are flowcharts illustrating a method for providing the braking level of a forward vehicle according to one embodiment of the present disclosure.

As show in FIG. 5, in the present disclosure, the positions of the brake lamps of a forward vehicle may be recognized based on the image of the forward vehicle and the relative acceleration of the forward vehicle (S100).

In the present disclosure, when the positions of the brake lamps of the forward vehicle are recognized, whether or not braking of the forward vehicle is performed may be determined based on a brake lamp image extracted from the image of the forward vehicle (S200).

Thereafter, in the present disclosure, upon determining that braking of the forward vehicle is performed, the braking level of the forward vehicle may be determined based on the relative acceleration of the forward vehicle (S300).

Next, in the present disclosure, when the braking level of the forward vehicle is determined, the determined braking level of the forward vehicle may be provided through an image (S400).

Thereafter, whether or not there is a request for terminating a process for providing the braking level of the forward vehicle may be confirmed (S500), and the process for providing the braking level of the forward vehicle may be terminated upon confirming that there is the request for terminating the process for providing the braking level of the forward vehicle.

Figure 6:
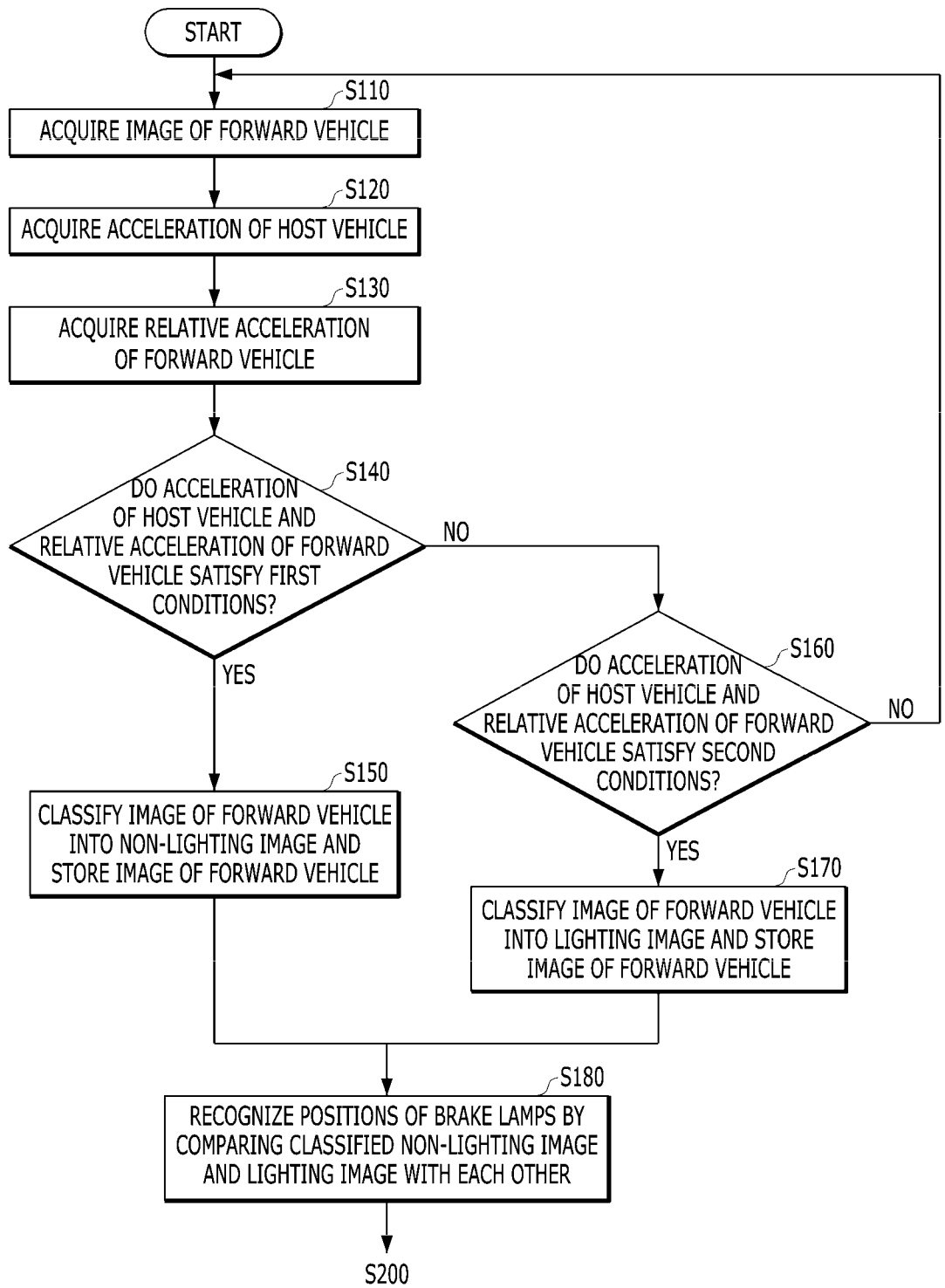

FIG. 6 is a flowchart illustrating in more detail the recognition of the positions of the brake lamps of the forward vehicle (S100) in FIG. 5.

As shown in FIG. 6, in the present disclosure, the image of the forward vehicle may be acquired (S110).

In the present disclosure, when the image of the forward vehicle is acquired, the acceleration of a host vehicle may be acquired (S120).

Thereafter, in the present disclosure, when the acceleration of the host vehicle is acquired, the relative acceleration of the forward vehicle may be acquired (S130).

Next, in the present disclosure, when the relative acceleration of the forward vehicle is acquired, whether or not the acceleration of the host vehicle and the relative acceleration of the forward vehicle satisfy first conditions may be confirmed (S140).

Here, the first conditions may be conditions in which both the acceleration of the host vehicle and the relative acceleration of the forward vehicle are 0 kph/s or higher.

Thereafter, in the present disclosure, when the first conditions are satisfied, the image of the forward vehicle may be classified into a non-lighting image in which the brake lamps are not turned on, and be stored (S150), and when the first conditions are not satisfied, whether or not the acceleration of the host vehicle and the relative acceleration of the forward vehicle satisfy second conditions may be confirmed (S160).

Here, the second conditions may be conditions in which the acceleration of the host vehicle is 0 kph/s and the relative acceleration of the forward vehicle is at a threshold, which is less than 0 kph/s, or lower.

Thereafter, in the present disclosure, when the second conditions are satisfied, the image of the forward vehicle may be classified into a lighting image in which the brake lamps are turned on, and be stored (S170).

Next, in the present disclosure, the positions of the brake lamps of the forward vehicle may be recognizing by comparing the classified and stored lighting image and non-lighting image with each other (S180).

Here, when the positions of the brake lamps of the forward vehicle are recognized, position information of the brake lamps of the forward vehicle may be stored, the brake lamp image may be extracted from the image of the forward vehicle based on the brake lamp position information, and the extracted brake lamp image may be stored.

Figure 7:
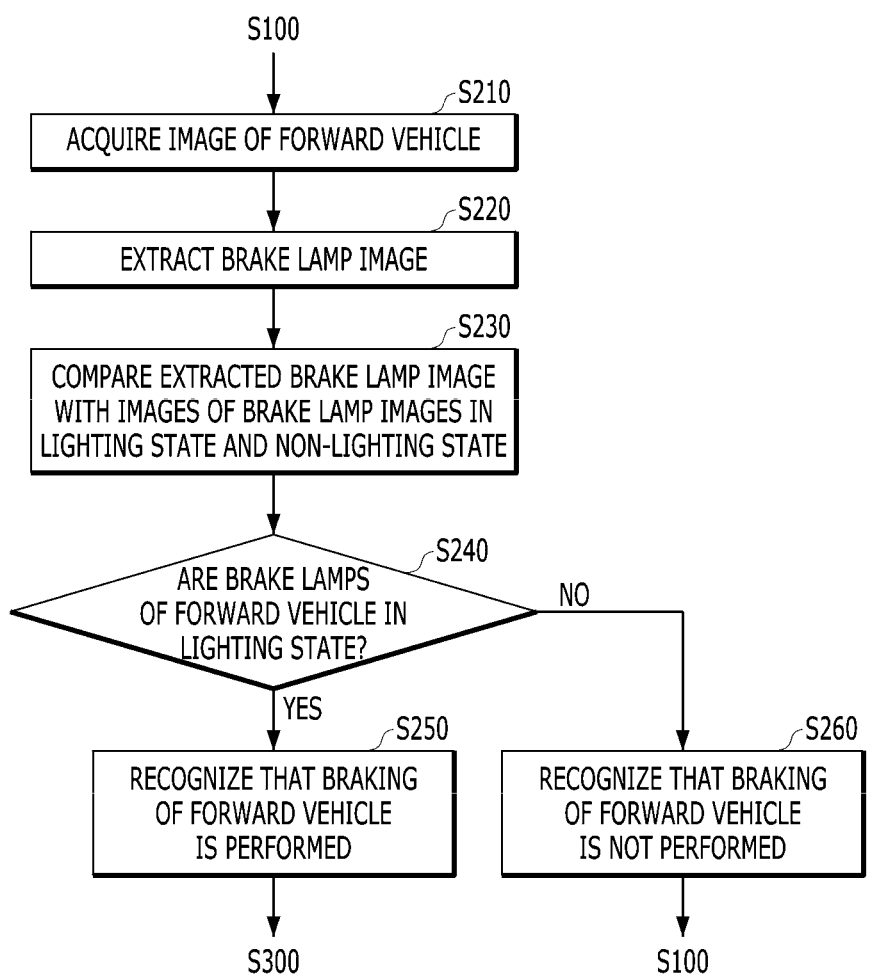

FIG. 7 is a flowchart illustrating in more detail the determination as to whether or not braking of the forward vehicle is performed (S200) in FIG. 5.

As shown in FIG. 7, in the present disclosure, the image of the forward vehicle may be acquired (S210).

In the present disclosure, when the image of the forward vehicle is acquired, the brake lamp image may be extracted from the image of the forward vehicle (S220).

Thereafter, in the present disclosure, the extracted brake lamp image may be compared with images of the brake lamps 530 in a lighting state and a non-lighting state, which are pre-stored (S230).

Next, in the present disclosure, whether or not the brake lamps of the forward vehicle are in the lighting state may be confirmed (S240).

Thereafter, in the present disclosure, when it is confirmed that the brake lamps of the forward vehicle are in the lighting state, it may be recognized that braking of the forward vehicle is performed (S250), and when it is confirmed that the brake lamps of the forward vehicle are not in the lighting state, it may be recognized that braking of the forward vehicle is not performed (S260).

Figure 8:
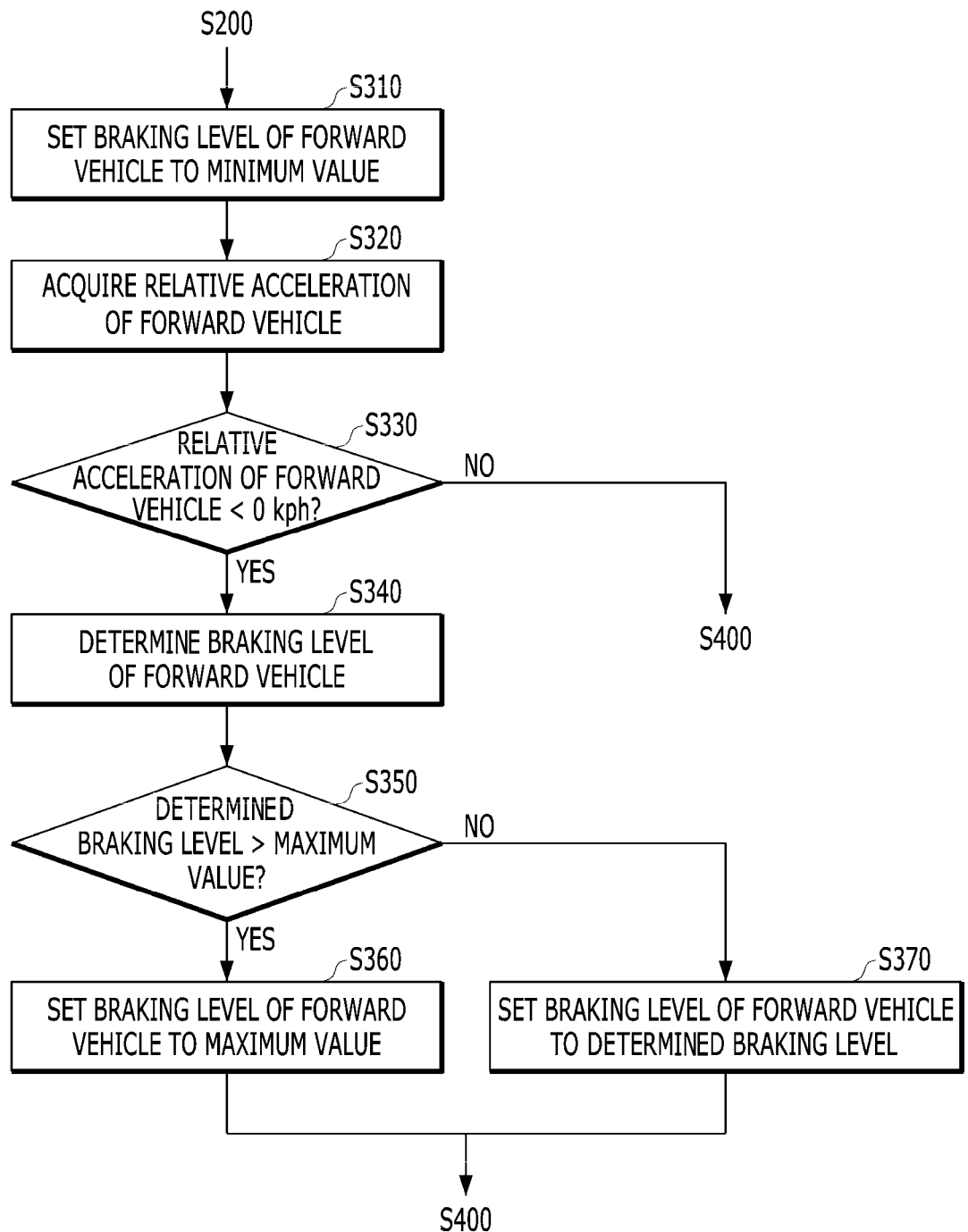

FIG. 8 is a flowchart illustrating in more detail the determination of the braking level of the forward vehicle (S300) in FIG. 5.

As shown in FIG. 8, in the present disclosure, when braking of the forward vehicle is performed, the braking level of the forward vehicle may be set to the minimum value (S310).

Then, in the present disclosure, the relative acceleration of the forward vehicle may be acquired (S320).

Thereafter, in the present disclosure, whether or not the relative acceleration of the forward vehicle is lower than 0 kph/s may be confirmed (S330).

Next, in the present disclosure, when the relative acceleration of the forward vehicle is lower than 0 kph/s, the braking level of the forward vehicle may be determined based on the relative acceleration of the forward vehicle (S340).

Here, in the present disclosure, the braking level of the forward vehicle may be determined based on a result value acquired by dividing the relative acceleration of the forward vehicle by 10.

Thereafter, in the present disclosure, whether or not the determined braking level is greater than the maximum value may be confirmed (S350).

Thereafter, in the present disclosure, when the determined braking level is greater than the maximum value of the braking level, the determined braking level may be set to the maximum value of the braking level (S360), and when the determined braking level is not greater than the maximum value, the determined braking level may be set to the braking level of the forward vehicle (S370).

Figure 9:
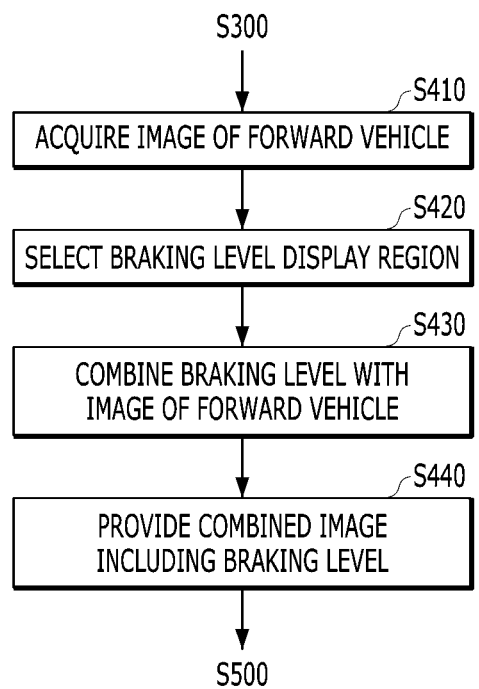

FIG. 9 is a flowchart illustrating in more detail the provision of the braking level through the image (S400) in FIG. 5.

As shown in FIG. 9, in the present disclosure, the image of the forward vehicle may be acquired (S410).

Thereafter, in the present disclosure, when the image of the forward vehicle is acquired, a braking level display region may be selected from the image of the forward vehicle (S420).

Here, in the present disclosure, a region of the image of the forward vehicle, which does not overlap the brake lamps, may be selected as the braking level display region.

Thereafter, in the present disclosure, the braking level may be combined with the selected braking level display region (S430).

Next, in the present disclosure, the combined image including the braking level may be provided (S440).

Here, in the present disclosure, the combined image of the forward vehicle including the braking level may be processed using augmented reality, and the processed image may be provided to a display of the host vehicle.

As such, in the present disclosure, the degree of braking of the forward vehicle is quantified into the braking level based on the image of the forward vehicle and the acceleration of the forward vehicle, and the braking level of the forward vehicle is provided through an image, thereby allowing a driver to directly recognize the degree of deceleration of the forward vehicle so as to enable the host vehicle to be efficiently driven in a traffic jam and improve energy efficiency.

Further, in the present disclosure, the degree of braking of the forward vehicle is displayed using augmented reality, and thus information assisting the driver in safely driving may be provided so as to avoid unnecessarily full braking.

In addition, in the present disclosure, full braking of the forward vehicle is recognized from a far distance and thus allows the driver to perform braking appropriate for the host vehicle, thereby being capable of reducing a possibility for accidents.

Moreover, in the present disclosure, the low braking level of the forward vehicle is recognized and thus allows the driver to perform braking appropriate for the host vehicle, thereby being capable of reducing unnecessary energy consumption.

Further, in the present disclosure, a computer readable recording medium, in which a program for executing the method for providing the braking level of the forward vehicle in the apparatus for providing the braking level of the forward vehicle according to one embodiment of the present disclosure is recorded, may execute a process provided by the method for providing the braking level of the forward vehicle.

The present disclosure may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid state disk (SSD), a silicon disk drive (SDD), a ROM, a RAM, a CD-ROM, a magnetic tape, a floppy disk, an optical data storage device, etc.

As is apparent from the above description, in an apparatus, method, and vehicle for providing the braking level of a forward vehicle according to at least one embodiment of the present disclosure, the degree of braking of a forward vehicle is quantified into the braking level based on the image of the forward vehicle and the acceleration of the forward vehicle, and the braking level of the forward vehicle is provided through an image, thereby allowing a driver to directly recognize the degree of deceleration of the forward vehicle so as to enable a host vehicle to be efficiently driven in a traffic jam and improve energy efficiency.

Further, in the present disclosure, the degree of braking of the forward vehicle is displayed using augmented reality, and thus information assisting the driver in safely driving may be provided so as to avoid unnecessarily full braking.

In addition, in the present disclosure, full braking of the forward vehicle is recognized from a far distance and thus allows the driver to perform braking appropriate for the host vehicle, thereby being capable of reducing a possibility for accidents.

Moreover, in the present disclosure, the low braking level of the forward vehicle is recognized and thus allows the driver to perform braking appropriate for the host vehicle, thereby being capable of reducing unnecessary energy consumption.

It will be apparent to those skilled in the art that various modifications and variations can be made in the present disclosure without departing from the spirit or scope of the disclosure. Thus, it is intended that the present disclosure cover the modifications and variations of the disclosure within the scope of the appended claims and their equivalents.

What is claimed is:

1. An apparatus for providing a braking level of a forward vehicle, comprising:
   a brake lamp position recognizing device configured to recognize positions of brake lamps of the forward vehicle based on an image of the forward vehicle and a relative acceleration of the forward vehicle;
   a braking determining device configured to determine whether or not braking of the forward vehicle is performed based on a brake lamp image extracted from the image of the forward vehicle when the positions of the brake lamps are recognized;

a braking level determining device configured to determine the braking level of the forward vehicle based on the relative acceleration of the forward vehicle upon determining that braking of the forward vehicle is performed; and a braking level image providing device configured to provide the determined braking level of the forward vehicle through an image when the braking level is determined.

2. The apparatus according to claim 1, wherein the brake lamp position recognizing device acquires the image of the forward vehicle from a front camera, and acquires the relative acceleration of the forward vehicle from a front radar.

3. The apparatus according to claim 1, wherein, in a recognition of the positions of the brake lamps of the forward vehicle, when the image of the forward vehicle is acquired, the brake lamp position recognizing device classifies the image of the forward vehicle into one of a lighting image in which the brake lamps are turned on and a non-lighting image in which the brake lamps are not turned on, stores the image of the forward vehicle as the one of the lighting image and the non-lighting image, and recognizes the positions of the brake lamps of the forward vehicle by comparing the classified lighting image and non-lighting image with each other.

4. The apparatus according to claim 3, wherein, in a classification of the image of the forward vehicle, when the image of the forward vehicle is acquired, the brake lamp position recognizing device acquires an acceleration of a host vehicle and the relative acceleration of the forward vehicle, and classifies the acquired image of the forward vehicle into one of the lighting image in which the brake lamps are turned on and the non-lighting image in which the brake lamps are not turned on based on the acceleration of the host vehicle and the relative acceleration of the forward vehicle.

5. The apparatus according to claim 3, wherein, when the brake lamp position recognizing device recognizes the positions of the brake lamps of the forward vehicle, the brake lamp position recognizing device stores position information of the brake lamps of the forward vehicle, extracts the brake lamp image from the image of the forward vehicle based on the position information of the brake lamps, and stores the extracted brake lamp image.

6. The apparatus according to claim 1, wherein, in a determination as to whether or not braking of the forward vehicle is performed, the braking determining device extracts the brake lamp image from the image of the forward vehicle, and determines whether or not braking of the forward vehicle is performed by comparing the extracted brake lamp image to pre-stored brake lamp images in a lighting state and a non-lighting state.

7. The apparatus according to claim 1, wherein, in a determination of the braking level of the forward vehicle, upon determining that braking of the forward vehicle is performed, the braking level determining device acquires the relative acceleration of the forward vehicle, and determines the braking level of the forward vehicle based on the relative acceleration of the forward vehicle when the acquired relative acceleration of the forward vehicle is lower than 0 kph/s.

8. The apparatus according to claim 7, wherein, upon determining that braking of the forward vehicle is performed, the braking level determining device sets the braking level of the forward vehicle to a minimum value before acquiring the relative acceleration of the forward vehicle.

9. The apparatus according to claim 7, wherein, in a determination of the braking level of the forward vehicle, when a result value acquired by dividing the relative acceleration of the forward vehicle by 10 is a maximum value of the braking level or less, the braking level determining device sets the braking level of the forward vehicle based on the result value.

10. The apparatus according to claim 7, wherein, in a determination of the braking level of the forward vehicle, when a result value acquired by dividing the relative acceleration of the forward vehicle by 10 is greater than a maximum value of the braking level, the braking level determining device sets the result value to the maximum value of the braking level.

11. The apparatus according to claim 1, wherein, in a provision of the braking level through the image, the braking level image providing device acquires the image of the forward vehicle, selects a braking level display region from the image of the forward vehicle, and provides an image, in which the braking level of the forward vehicle is displayed, to the selected braking level display region.

12. The apparatus according to claim 1, wherein, in a provision of the braking level through the image, the braking level image providing device processes the image of the forward vehicle comprising the braking level using augmented reality, and provides the processed image of the forward vehicle to a display of a host vehicle.

13. The apparatus according to claim 1, wherein, in a provision of the braking level through the image, when at least one of the brake lamps of the forward vehicle is in a non-lighting state, the braking level image providing device processes the image of the forward vehicle using augmented reality so that the image of the forward vehicle comprises an image of the brake lamps in a lighting state and the braking level, and provides the processed image of the forward vehicle to a display of a host vehicle.

14. A method for providing a braking level of a forward vehicle in an apparatus for providing the braking level of the forward vehicle, comprising a brake lamp position recognizing device, a braking determining device, a braking level determining device and braking level image providing device, the method comprising:

recognizing, by the brake lamp position recognizing device, positions of brake lamps of the forward vehicle based on an image of the forward vehicle and a relative acceleration of the forward vehicle;

determining, by the braking determining device, whether or not braking of the forward vehicle is performed based on a brake lamp image extracted from the image of the forward vehicle when the positions of the brake lamps are recognized;

determining, by the braking level determining device, the braking level of the forward vehicle based on the relative acceleration of the forward vehicle upon determining that braking of the forward vehicle is performed; and providing, by the braking level image providing device, the determined braking level of the forward vehicle through an image when the braking level is determined.

15. The method according to claim 14, wherein the recognizing positions of brake lamps of the forward vehicle comprises:

acquiring the image of the forward vehicle;
acquiring an acceleration of a host vehicle;
acquiring the relative acceleration of the forward vehicle;

confirming whether or not the acceleration of the host vehicle and the relative acceleration of the forward vehicle satisfy first conditions;

classifying the image of the forward vehicle into a non-lighting image in which the brake lamps are not turned on and storing the image of the forward vehicle as the non-lighting image when the first conditions are satisfied, and confirming whether or not the acceleration of the host vehicle and the relative acceleration of the forward vehicle satisfy second conditions when the first conditions are not satisfied;

classifying the image of the forward vehicle into a lighting image in which the brake lamps are turned on and storing the image of the forward vehicle as the lighting image when the second conditions are satisfied; and recognizing the positions of the brake lamps of the forward vehicle by comparing the lighting image and the non-lighting image to each other.

16. The method according to claim 15, wherein:

the first conditions are conditions in which both the acceleration of the host vehicle and the relative acceleration of the forward vehicle are 0 kph/s or higher; and the second conditions may be conditions in which the acceleration of the host vehicle is 0 kph/s and the relative acceleration of the forward vehicle is at a threshold, configured to be less than 0 kph/s, or lower.

17. The method according to claim 14, wherein the determining whether or not braking of the forward vehicle is performed comprises:

acquiring the image of the forward vehicle;

extracting the brake lamp image from the image of the forward vehicle;

comparing the extracted brake lamp image to pre-stored brake lamp images in a lighting state and a non-lighting state;

confirming whether or not the brake lamps of the forward vehicle are in the lighting state, as a result of the comparison of the extracted brake lamp image; and recognizing that braking of the forward vehicle is performed upon confirming that the brake lamps of the forward vehicle are in the lighting state, and recognizing that braking of the forward vehicle is not performed upon confirming that the brake lamps of the forward vehicle are not in the lighting state.

18. The method according to claim 14, wherein the determining the braking level of the forward vehicle comprises:

setting the braking level of the forward vehicle to a minimum value when braking of the forward vehicle is performed;

acquiring the relative acceleration of the forward vehicle;

confirming whether or not the relative acceleration of the forward vehicle is lower than 0 kph/s;

determining the braking level of the forward vehicle based on the relative acceleration of the forward vehicle upon confirming that the relative acceleration of the forward vehicle is lower than 0 kph/s;

confirming whether or not the determining braking level is greater than a maximum value of the braking level; and setting the determined braking level to the maximum value of the braking level when the determined braking level is greater than the maximum value, and setting the determined braking level to the braking level of the forward vehicle when the determined braking level is not greater than the maximum value.

19. The method according to claim 14, wherein the providing the braking level through the image comprises:

acquiring the image of the forward vehicle;

selecting a braking level display region from the image of the forward vehicle;

combining the braking level with the selected braking level display region;

providing the image of the forward vehicle comprising the braking level combined therewith.

20. A vehicle comprising:

a camera configured to acquire an image of a forward vehicle;

a radar configured to acquire a relative acceleration of the forward vehicle;

a display configured to display a braking level image of the forward vehicle; and an apparatus for providing a braking level of the forward vehicle, configured to determine the braking level of the forward vehicle based on the image of the forward vehicle and the relative acceleration of the forward vehicle and to provide the braking level through an image, wherein the apparatus recognizes positions of brake lamps of the forward vehicle based on the image of the forward vehicle and the relative acceleration of the forward vehicle, determines whether braking of the forward vehicle is performed based on a brake lamp image extracted from the image of the forward vehicle, determines the braking level of the forward vehicle based on the relative acceleration of the forward vehicle, generates the braking level image based on the determined braking level of the forward vehicle, and provides the braking level image to the display.

* * * * *